J. STEGER.
Pocket Level.
No. 26,956.
Patented Jan'y 24, 1860.
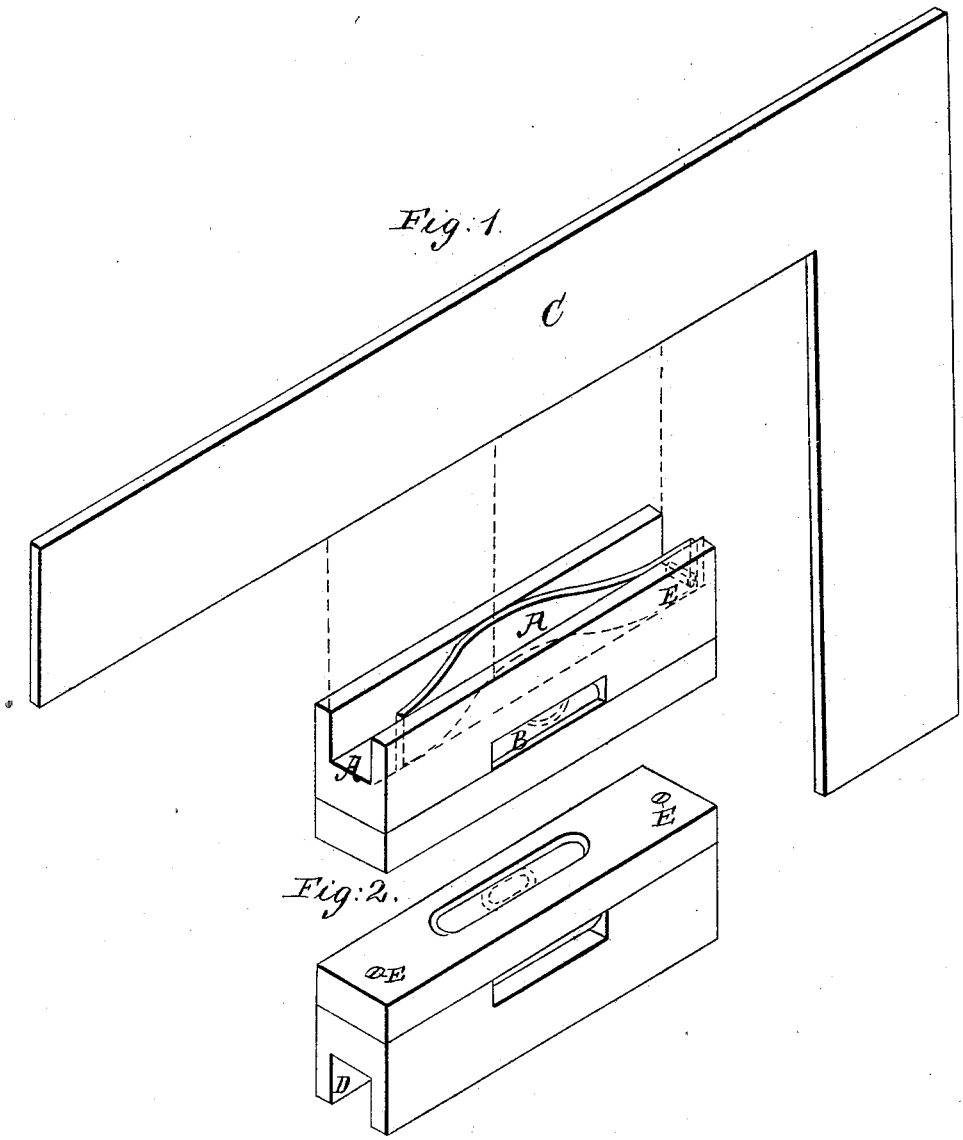

UNITED STATES PATENT OFFICE.

JOSEPH STEGER, OF MATTEAWAN, NEW YORK, ASSIGNOR TO JAMES M. FREAR, OF PEEKSKILL, NEW YORK.

DEVICE FOR ATTACHING SPIRIT-LEVELS TO A SQUARE.

Specification of Letters Patent No. 26,956, dated January 24, 1860.

*To all whom it may concern:*

Be it known that I, JOSEPH STEGER, of the village of Matteawan, in the county of Dutchess and State of New York, have invented a new and Improved Mode of Constructing Spirit-Levels or Pocket-Levels; and I do hereby declare that the following is a full and exact description of the same.

The nature of my invention consists in providing the lower part of the level with a groove and spring, and the insertion of mercury, spirits or water in such a manner that I am enabled to level from above by reversing the level as shown in Fig. 1 in the accompanying drawing.

To enable others skilled in the art to make and use my invention, I will proceed to describe its construction and operation.

I construct my level in any of the known forms, and apply thereto a groove and spring at the bottom as shown at A, Fig. 1, in the reversed level, and insert the mercury, spirits or water in the level in such manner as enables me to observe its operation when so reversed as shown at B in Fig. 1.

The letter C in Fig. 1 represents a square, and the perpendicular dotted lines refer to the manner in which the square and level are attached to each other.

Fig. 2 represents the usual or common level in its natural position, and the letter D in Fig. 2 the attachment of the groove to the bottom of the level.

The letter E in Figs. 1 and 2 represents the mode or manner of attaching the spring in the groove, and the cap to the level to confine the glass containing mercury, spirits, &c., as shown in the accompanying drawing.

What I claim as my invention, and desire to secure by Letters Patent, is—

I claim a level constructed as set forth, so as to be adjusted to an ordinary square in the manner shown.

JOSEPH STEGER.

Witnesses:
JOHN LAMOREAUX,
ISAAC J. BAXTER.